United States Patent [19]
Lin et al.

[11] Patent Number: 5,590,367
[45] Date of Patent: *Dec. 31, 1996

[54] PROCESSING MODULE FOR PROGRAMMABLE PROCESSING USING COMPUTER GENERATED HOLOGRAMS

[75] Inventors: Tsen-Hwang Lin, Dallas; Falvey Malarcher, Plano, both of Tex.

[73] Assignee: Texas Instruments Incorporated, Dallas, Tex.

[*] Notice: The term of this patent shall not extend beyond the expiration date of Pat. No. 5,247,593.

[21] Appl. No.: 466,028

[22] Filed: Jun. 6, 1995

Related U.S. Application Data

[63] Continuation of Ser. No. 275,463, Jul. 14, 1994, abandoned, which is a continuation of Ser. No. 809,595, Dec. 18, 1991, abandoned.

[51] Int. Cl.$^6$ .................................................. G06F 3/00
[52] U.S. Cl. .............................. 395/800; 385/17; 359/9; 359/11
[58] Field of Search ........................ 395/800; 359/1, 359/9, 11, 15; 385/17

[56] References Cited

U.S. PATENT DOCUMENTS

| | | | |
|---|---|---|---|
| 4,764,890 | 8/1988 | Hinton | 364/807 |
| 4,811,210 | 3/1989 | McAulay | 395/312 |
| 4,859,012 | 8/1989 | Cohn | 350/96.24 |
| 4,943,556 | 7/1990 | Szu | 505/1 |
| 4,946,253 | 8/1990 | Kostuck | 350/169 |
| 5,119,214 | 6/1992 | Nishii et al. | 359/7 |
| 5,159,473 | 10/1992 | Feldman | 359/1 |
| 5,170,269 | 12/1992 | Lin et al. | 359/9 |
| 5,182,780 | 1/1993 | Robertson | 385/14 |
| 5,220,622 | 6/1993 | Scarr | 382/31 |
| 5,220,643 | 6/1993 | Collings | 395/25 |
| 5,247,593 | 9/1993 | Lin et al. | 385/17 |
| 5,416,616 | 5/1995 | Jenkins et al. | 359/11 |
| 5,428,466 | 6/1995 | Rejman-Greene et al. | 359/15 |

OTHER PUBLICATIONS

Kajiki, et al., "An Optical Pattern Classification Using Computer–Generated Holograms", *Japanese Journal of Applied Physics*, vol. 29, No. 7/2, Jul. 1990, pp. L1274–L1276.

Alistair D. McAulay, "An Extendable Optically Interconnected Parallel Computer", *Proceedings of the Fall Joint Computer Conference*, 1986, pp. 441–447.

Tanida, et al., "Modular Components for an Optical Array Logic System", *Applied Optics*, vol. 26, No. 18, 15 Sep. 1987, pp. 3954–3960.

Kostuk et al., "Polarization Properties of Substrate–Mode Holographic Interconnects", *Applied Optics*, vol. 29, No. 26, 10 Sep. 1990, pp. 3848–3854.

Hogari et al., "Two–Dimensional Multichannel Optical Switch", *Proceedings, International Topical Meeting*, 12–14 Apr. 1990, pp. 204–207.

Suzuki et al., "Two–Dimensional Photonic Switching Network Using Waveguide Optics", *Proceedings, International Topical Meeting*, 12–14 Apr. 1990, pp. 204–207.

McAulay et al., "Spatial–Light–Modulator Interconnected Computers", *Computer*, vol. 20, No. 10, Oct. 1987, pp. 45–57.

Lin, et al., "Two-dimensional optical Clos interconnection network and its uses", *Applied Optics*, vol. 27, No. 9, 1 May 1988, pp. 1734–1741.

(List continued on next page.)

*Primary Examiner*—Mehmet B. Geckil
*Assistant Examiner*—John Follansbee
*Attorney, Agent, or Firm*—Dana Burton; James C. Kesterson; Richard L. Donaldson

[57] ABSTRACT

This is a processing module which may be used for parallel processing. Multiple software configurable optical interconnections provide for high speed processing which preferably use computer generated holograms to communicate among multiple processing elements. Other methods and devices are disclosed.

4 Claims, 4 Drawing Sheets

OTHER PUBLICATIONS

R. A. Spanke, "Architectures for Guided–Wave Optical Space Switching Systems", *IEEE Communications Magazine*, vol. 25, No. 5, May 1987, pp. 42–48.

Evankow Jr., et al., "Photonic Switching Modules Designed with Laser Diode Amplifiers", *IEEE Journal on Selected Areas in Communication*, vol. 6, No. 7, Aug. 1988, pp. 1087–1095.

Falvey Malarcher, "Parallel Computing System Architecture", *TI Technical Journal*, pp. 28–37, Sep.–Oct., 1990.

T. Gus McDonald, et al., "WM22 Deformable Mirror Device Based 4×4 Fiber Optic Cross–bar Switch", *Wednesday Poster*, p. 121, OFC '90.

H. S. Hinton, "Photonic Switching and Optical Computing Based on Free–Space Digital Optics", *SPIE–Digital Optical Computing II*, pp. 132, 134–142, vol. 1215, 1990.

Aloke Guha, et al., "Optical Interconnections for Massively Parallel Architectures", *Applied Optics*, pp. 1077–1093, vol. 29, No. 8, Mar. 10, 1990.

E. E. E. Frietman, et al., "Parallel Optical Interconnects: Implementation of Optoelectronics in Multiprocessor Architectures", *Applied Optics*, pp. 1161–1177, vol. 29, No. 8, Mar. 10, 1990.

Kai Hwang, "Advanced Parallel Processing with Supercomputer Architectures", *Proceedings of the IEEE*, pp. 1348–1379, vol. 75, No. 10, Oct. 1987.

John A. Neff, "Optical Interconnects for Multiprocessors", *SPIE–Interconnection of High Speed and High Frequency Devices and Systems*, pp. 13–18, vol. 947, 1988.

F. Kiamilev, et al., "Programmable Optoelectronic Multiprocessors and Their Comparison with Symbolic Substitution for Digital Optical Computing", *Optical Engineering*, pp. 396–408, vol. 28, No. 4, Apr. 1989.

L. A. Bergman, et al., "Holographic Optical Interconnects for VLSI", *Optical Engineering*, pp. 1109–1118, vol. 25, No. 10, Oct. 1986.

N. C. Roberts, "Fixed Holographic Optical Interconnects for Neural Networks", *SPIE–Optical Interconnections and Networks*, pp. 151–156, vol. 1281, 1990.

5,590,367

PROCESSING MODULE FOR PROGRAMMABLE PROCESSING USING COMPUTER GENERATED HOLOGRAMS

This application is a continuation of application Ser. No. 08/275,463, filed Jul. 14, 1994, now abandoned, which is a continuation of 07/809,595 filed Dec. 18, 1991, now abandoned.

CROSS-REFERENCE TO RELATED APPLICATIONS

The following coassigned patent applications are hereby incorporated herein by reference:

| Ser. No. | Filing Date | TI Case No. |
| --- | --- | --- |
| 07/809,780 | 12/18/91 | TI-16333 |
| 07/829,100 | 12/18/91 | TI-16824 |
| 07/809,786 | 12/18/91 | TI-16825 |

FIELD OF THE INVENTION

This invention generally relates to optical interconnects and parallel processing.

BACKGROUND OF THE INVENTION

Without limiting the scope of the invention, its background is described in connection with optical interconnects and parallel computing. Optical interconnections are generally divided into two categories, guided wave and free-space optics. Guided wave interconnection uses optical fiber or integrated optics methods. Disadvantages of guided wave optical interconnects include fixed interconnects and a crowded backplane. The advantage of guided wave connection is the precision in reaching the destination. However, free-space optics can provide a similar advantage if properly arranged. Furthermore, free-space optics solve routing restriction by utilizing the advantage of non-interactive property of photons when crossing over.

Backplane crowdedness becomes an important issue when submicron technology allows the existence of multi-million-transistor chips and the co-existence of sophisticated functional blocks in the chips. The implementation of the communications between the chips tends to negate the advantage of the submicron technology for reasons including the following: (1) the number of I/O pins grows with the complexity of the chip; (2) the narrower the interconnection metallization the higher the resistance; (3) the closer the line is the higher the stray capacitance is, and hence the higher RC time constant will induce slower I/O rate for more functionality; (4) the multiple use of the I/O interconnects to limit their number results in the use of one or more crossbar-switches which dominate the board space as the parallelism increases; and (5) the technique of limiting the number of I/O paths between complex components and not using crossbar interconnect self-organization results in I/O blocking and performance that is dependent on the time varying demand for specific I/O paths.

The state-of-the-art microprocessor runs above 150 MHz. It is expected to achieve a clock rate of 0.5 GHz with the assistance of BiCMOS and GaAs technologies. The 25 MHz processors (i.e. TI's TMS320C40) are achieving 50 MFLOP performance, therefore, the newer technologies are expected to achieve 1 GFLOP performance. The newer technologies will require 1000 parallel processors to achieve a teraflop (TFLOP) performance; note the current technology requires more than 20000 parallel processor. In the foreseeable future, massively parallel computing systems will be required to achieve TFLOP computing capability. Therefore, this system must solve the interconnection problem for very large numbers of computing elements without diminishing the delivered performance relative to the available performance.

Considerable study has been given to the applications of fixed interconnect strategies in parallel computing architectures. These strategies result in a system with, for example, tiered-bus, two-dimensional (2D) mesh, three-dimensional (3D) mesh, multi-degree hypercube, and tiered binary crossbar architectures. In general, all of the strategies result in a system performance that is dependent on the number of independent paths provided from point A to arbitrary point B in the system. I/O contention decreases the delivered performance from the systems available capability based on the specific applications data communication requirements. Therefore, different architectures will provide better results depending on the application run on them.

A non trivial secondary attribute of these fixed interconnect strategies is the mapping of the applications onto the architecture. This mapping can have a dominant impact on the system performance. The application is the set of system functions for which the parallel computing system is needed. These functions represent the perceived system solution to some problem and that solution has some natural structure and parallelism. One must then try to optimize the mapping of this solution, which may have been very difficult to conceive of in its own right, onto the parallel computing system's architectural connectivity and parallelism. This mapping of application data flow and parallelism onto hardware interconnect structure and parallelism is a problem which is essentially unsolved to date.

SUMMARY OF THE INVENTION

This is a processing module. The module comprises: at least one processing board having at least one spatial light modulator; at least one signal receiver; at least one signal transmitter; at least one hologram; and at least one communicator to provide for external communication for the processing board. Preferably, the spatial light modulator is a DMD; the hologram is a CGH; the hologram has one or more clear spots to allow for external communication; the signal receiver is a processing element; the signal transmitter is a laser; and the communicator converts optical signals to and from free-space.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

The present invention offers a new interconnect strategy that replaces the fixed interconnect strategies with a strategy of multiple software configurable (SELF-ORGANIZED) interconnects. This strategy preferably makes use of serial optical interconnect channels using preferably Digital Micro-Mirror Device (DMD), Computer Generated Hologram (CGH) and LASER technologies. Applying this strategy allows for very dense parallel computing nodes and modules. The present invention also offers large interconnect switches. The present invention combined with system software control algorithms results in the capability to realize a TERAFLOP computing system within a very dense form factor compared to the prior art strategies. This system is able to deliver its performance capacity in a deterministic manner and the applications will configure the system resources to it's natural architectural connectivity and parallelism. Therefore, performance can be designed into a system that will be independent of loading, and the problem of mapping the application's structure to a fixed hardware structure is eliminated.

Figures 1, 1A:
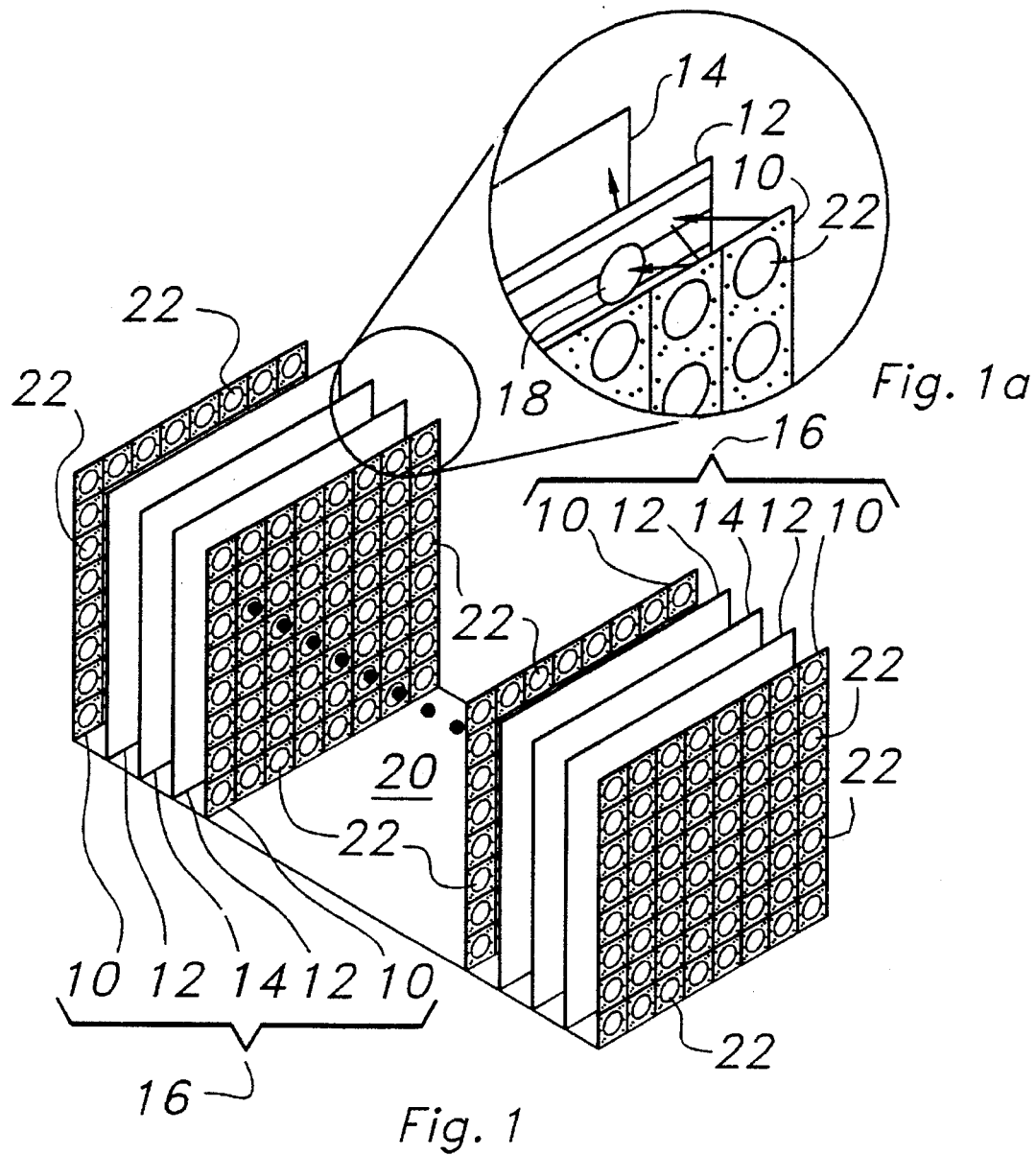
FIG. 1 is a conceptual representation of a preferred embodiment of processing modules.
FIG. 1a is a detailed view of a portion of FIG. 1.

In a preferred embodiment of the present invention, the parallel computing block may be divided into modules 16, as shown in FIG. 1. Each module 16 may be configured as follows: the outermost boards may be two processor boards 10 facing each other, and between the two processor boards 10 may be two CGH boards 12 sandwiching one or more extension boards 14.

The basic optical communication concept used may involve the combination of DMD technology to select paths of communication, laser technology to encode the data, and CGH technology to provide the bank of optical paths to provide intraboard communication. Interboard communication may also be required. This may preferably be accomplished by allowing the diffractive beam for interboard communication to pass through a clear area 18 of the CGH (as opposed to the area covered by aluminum and used for intraboard communication) to reach an extension board 14 sitting at the middle of the group, as shown in FIG. 1a. The extension board 14 then forms the channel between the processor boards 10 and other extension boards 14 in other modules 16 (and the mother-board 20), and hence the other processor boards 10. Each processor board 10 preferably contains multiple processing elements 22 (PE) which may include a signal receiver such as a processor, a DMD, and a signal transmitter such as a laser. The DMDs and lasers are utilized along with the CGH boards 12 to communicate from PE 22 to PE 22 within the same processing board 10. The extension boards 14 along with the DMDs, lasers, and CGH boards 12 provide for PE 22 to PE 22 communication among different processing boards 10 both within the same module 16 and in different modules 16. Utilizing lensless diffractive optics and guided wave, the physical size of the teraflop machine will be dramatically reduced.

Parallel computing system architecture, which utilizes, for example, guided-wave/freespace crossbar switch and high density node module techniques, provides a software configurable system at the node level. The system hierarchy is a system of computing networks (CN) 40 interconnected via software configurable communication channels (SCC) and external ports. The concept of the system being made up of CNs 40 relieves the system of being limited to the number of nodes that can be accommodated by a crossbar switch size. Many communication channels can be provided between CN external ports to connect, under software control, processors in different CNs 40.

Figure 2:
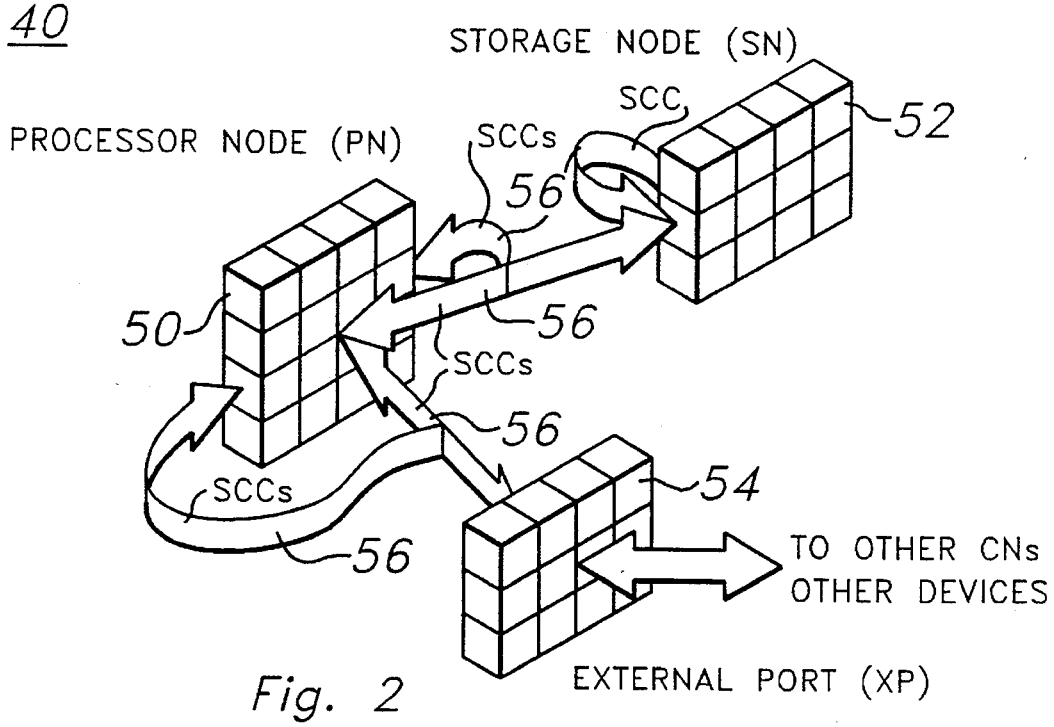
FIG. 2 is a conceptual representation of a preferred embodiment of a computing network.

A computer network (CN) 40 preferably provides the computing resources in the form of processor nodes (PN) 50, global storage resources in the form of storage nodes (SN) 52, and external ports in the form of interconnect switch input/output channel connections (XP) 54, shown in FIG. 2. In this example, each PN 50 and SN 52 may be provided with six parallel full-duplex communication channels (CCs)(not shown), however more or less CCs may be used as desired. Each software configurable communication channel (SCC) 56 may be composed of CCs, each from PNs/SNs/XPs 50/52/54 combinations. One possible configuration could be for the first CC for each node to be routed to the first SCC, the second CC for each node to be routed to the second SCC, etc. In this example, a crossbar switch is preferably used for the SCCs 56. Each SCC 56 may be controlled by a PN with specific functions. In this example, if six SCCs 56 are used, two may be software configured for synchronized PN/SN time division multiplexed (TDM) SN access, others may be software configured, static configured, SN communication ring, and PN/XP application dependent interconnects. The CN 40 size, number of nodes in each population, is determined by the size of the interconnection switch that can be provided by the proposed technologies. For example, one possible crossbar switch 56, shown in FIG. 3, may be implemented using current 6" wafer technology. Present CGH technology can provide approximately 1020 interconnection patterns per square centimeter (ip/cm$^2$). Therefore, within the area provided by current wafer technology we have a capability for 18e4 interface patterns (ip). If Ni is the number of CCs to be handled by each modular switch in the SCC 56 and the maximum desired communication is one-to-four, each CC 56 will require a number of ips $$ip/SCC=Ni+0.5Ni+0.25Ni$$

where the first term is for one-to-one communication, the second term is for the one-to-two case, and the third term is for the one-to-four case. Therefore, in this case, the maximum channels per modular switch (mcps) is:

$$1.75*mcps^2<18e4$$

Solving for mcps:

$$mcps=320$$

Figure 3:
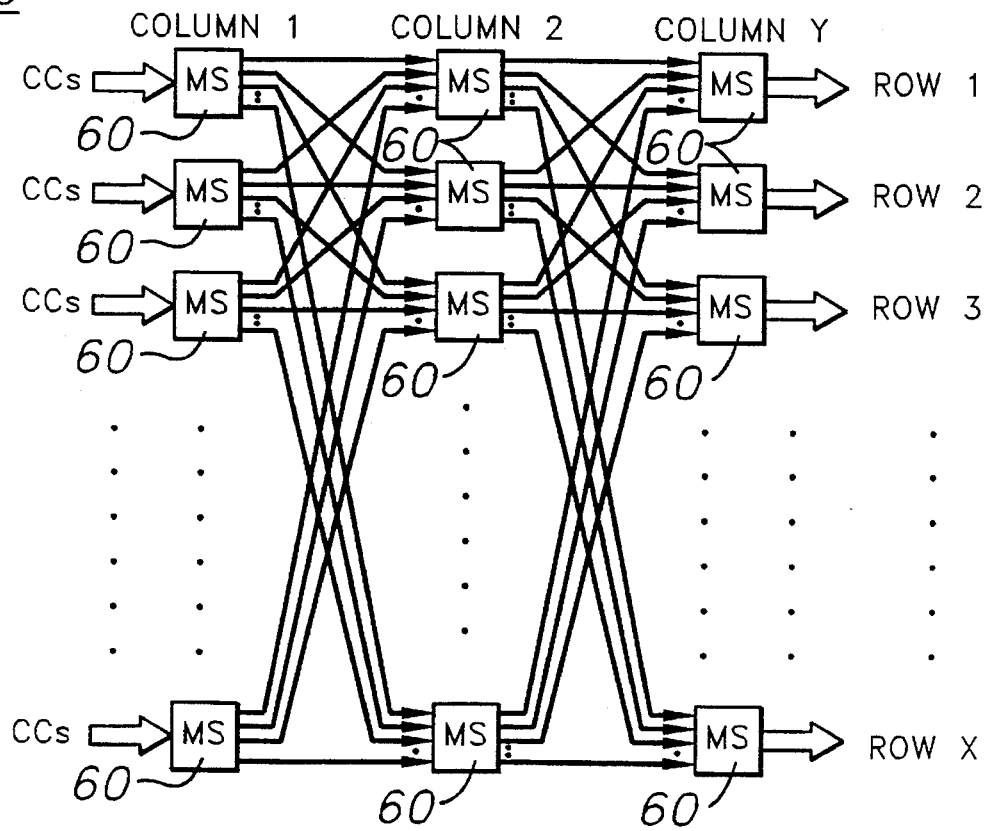
FIG. 3 is a conceptual representation of a preferred embodiment of a switching system.

An example of a preferred embodiment of the SCC switch 56 is shown in FIG. 3. The SCC switch 56 consist of modular switches (MSs) 60 arranged in X rows by Y columns. Each MS 60 in column one has 1/Xth of its outputs preferably waveguided to each MS 60 in column two, and each MS 60 in column two is likewise connected to each MS 60 in column three, etc. If desired optical connection schemes other than waveguides may be used to connect the MSs 60 from column to column. For this example, each SCC 56 may be composed of a PN with a specific function, and 3*X MSs 60. If packaging constraints were to limit each SCC 56 to forty-eight MSs 60, and three rows are used, the total number of PNs 50, SNs 52, and XPs 54 in one CN 40 is 5120 (X=48/3 and 5120=X·mcps). The maximum number of SNs 52 is naturally limited because the storage access protocol is going to limit storage within the CN 40. If the minimum SN 52 storage is 8 MB per node in a 32 bit system ($2^{32}$ addressing unit and 4 byte/unit), there will be no more than 2142 SNs 52 in one CN 40. Therefore, the switch 42, in this example, may support a CN 40 with up to 2978 PN 50 plus XPs 54. Note that each CN 40 may have a PN 50 dedicated to each SCC 42. The individual MSs 60 may be implemented in different ways. For example, they may be realized with fiber optics, spatial light modulator arrays, or, preferably, with a DMD/CGH combination as used in other subsystems of this invention.

The disclosed shared storage parallel access protocol provides a time division multiplexed parallel non-blocked access to shared storage for each PN 50. This is achieved by having the PN 50 and SN 52 access crossbar commutate it's interconnects. This results in the shared storage being functionally a dedicated disk to each PN 50 with the storage accessed in parallel by each PN 50. Latency and transfer rate of SN 52 data accessing are major issues of computation. The latency (L) is a function of the channel commutation rate, which is a function of the channel transmission efficiency and bit rate.

The PN 50, SN 52, and XP 54 node populations are all flexible in size within the switch 56. In the preferred embodiment described, the CN 40 has six communication channels (CCs) within it's PN 50 population. Each communication channel may allow for software configuration capability for a specific SCC 56. A switch 56 may also be used to interconnect SN 52 to SN 52.

In the example given, two of the six PN CCs may be used for time division multiplexed global storage access, one for synchronization and the other for data access. The remaining four are available for application software configuration. The four application available full duplex SCCs 56 provide the capability for applications to configure subsets of the CN's 40 PNs 50 into pipeline, 2D-mesh, 3D-mesh, 5-node shuffle, or degree 4 hypercube. Note the entire CN computing resources are not configured, only the PNs 50 and XPs 54 committed to the application function are configured. All PNs 50 may maintain non-blocked global storage access. Due to the resource configuration capability provided by the proposed interconnect technology, many parallel computing functions may be executed. The execution of any function in the system is independent of other functions in terms of communication and global storage access capability. This is a novel parallel computing system invention that is achievable because of the interconnect technology disclosed.

A preferred embodiment of the present invention contains programmable optical interconnect systems combining a CGH and one or more Digital Micro-Mirror Device (DMD) SLMs. The energy efficiency can be up to 50% with this combination. It is a more sophisticated combination than the CGH or the SLM alone but it is more flexible and energy efficient.

This programmable optical interconnect system may be developed, as in the preferred embodiment described above, for use in systems such as a parallel computing system consisting of a wafer-scale integrated array of processors, with integrated photodetectors as signal receivers and optical sources, such as lasers, as signal transmitters. The combined hologram/DMD programmable connection system will provide the inter-processor interconnects by connecting the lasers and detectors in appropriate patterns. An interconnection scheme that uses a set of DMD's, and a CGH to perform the communication among multiple processing elements (PEs) is one potential use of this optical interconnect. The basic concept used in configuring the interconnects is the interference property of light. This, or variations of this optical interconnect system may be used in several subsystems of the disclosed invention. For example, it may be used in the individual modules 16 and in the crossbar switches.

The above optical interconnect scheme can provide arbitrary 1-to-1, many-to-one, and one-to-many connections. The DMD/CGH system may be designed to change the phase of the beams going to the individual detectors, therefore allowing numerous connection schemes to be achieved.

The CGH in this system may serve several purposes which include concentrating beams onto the DMD modulator elements, collimating and fanning out the modulated signal beams, and focusing the collimated beams onto detectors. The interconnect scheme may be changed in this optical interconnect system through the use of the DMDs for phase modulation and encoding the CGH such that the collimated beams have the desired phase. The fabrication method used for the CGH is important only in that the desired performance of the CGH is obtained. Fabrication methods for CGH exist that are well known in the art.

The optical interconnection scheme provided above utilizes a DMD/CGH combination. The DMDs are used for interconnection path selection, using, preferably, phase-only, frame addressable and microsecond reconfigurable DMDs as light modulators. Reconfigurability is accomplished with an in-phase/out-of-phase interference mechanism. The system offers advantages such as high optical efficiency, reconfiguring effective architecture, high density interconnects and a compact system.

The DMD used in the various subsystems described herein may be a flexure beam DMD. The flexure beam pixel is a special version of a cantilever beam DMD. By arranging four cantilever hinges at right angles to one another, the beam is forced to move with a piston-like motion. The flexure beam DMD yields phase-dominant modulation which is ideal for the preferred embodiment of this invention. Other types of DMDs such as torsion or cantilever beams may be used in this invention.

Figure 4:
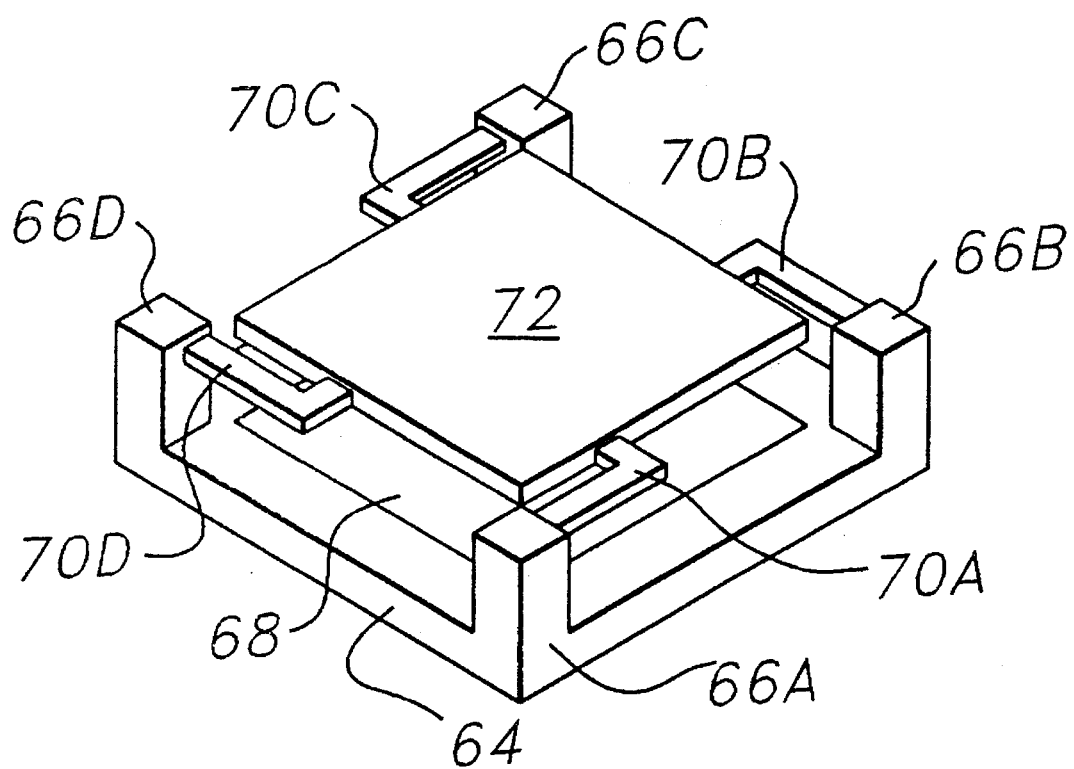
FIG. 4 is a configuration of a flexure beam DMD.

FIG. 4 shows a configuration of a flexure beam DMD. An addressing electrode 68 is built onto a substrate 64. A mirror element 72 is built onto a spacer covering the layer containing the addressing electrode 68. The spacer layer is then etched away. This leaves a layer of support posts 66A, 66B, 66C, and 66D, with a gap between the mirror element 72 and the electrode 68. When a pre-determined voltage is applied to electrode 68, mirror element 72 is electrostatically attracted to it. The flexure hinges 70A, 70B, 70C, and 70D, allow the mirror to deflect downwards. Since all four corners are supported the mirror deflects with a piston-like movement.

Figure 5:
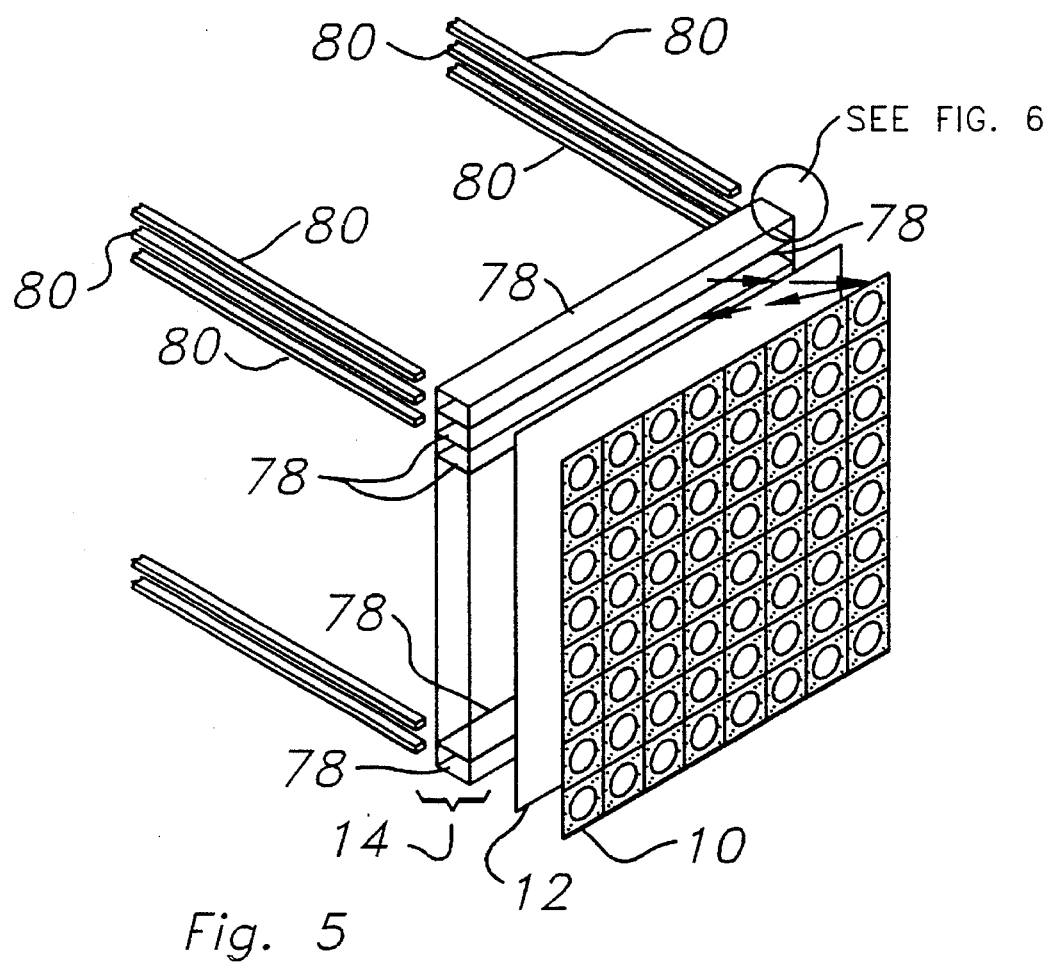
FIG. 5 is a conceptual representation of a preferred embodiment of a portion of a processing module.

A preferred embodiment of a portion of the module 16 from FIG. 1 is shown in FIG. 5. The portion of module 16 shown in FIG. 5 consists of three boards, an extension board 14 containing multi-chip-module (MCM) substrates 78, a CGH board 12, and a processor board 10. Two of the functions served by the extension board 14 are to accept the signals from other modules 16 to communicate with processing elements (PEs) 22 in the module 16, and to regenerate the signals from the PEs 22 into the guided waves to send them to other modules 16. In other words, each pixel of the array in the extension board is preferably composed of two fibers, one for an incoming signal, the other for a regenerated outgoing beam. The CGH board uses partial transmission and partial reflective modes.

Free-space interconnects provide for condensed communication channels in local areas. In cases where information needs to be exchanged beyond the local region, signals carried by free-space optics need to be converted to that carried by guided wave, so that they may be brought to a convenient location to be exchanged. After reaching the convenient location, the guided wave will be converted back to the free-space scheme to pursue massive interconnection operation.

Figure 6:
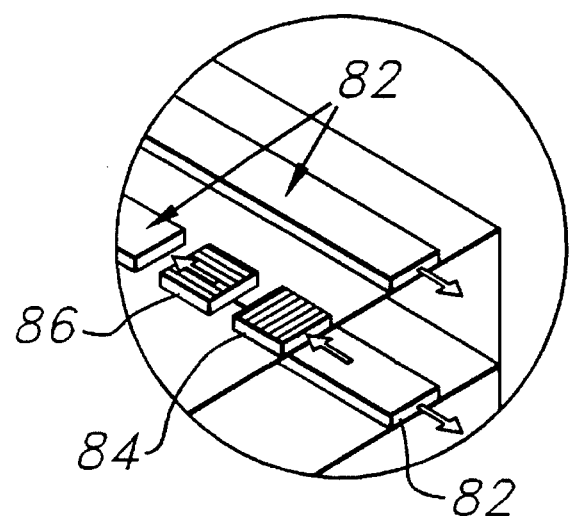
FIG. 6 is a conceptual representation of a preferred embodiment of an extension board.

The extension board 14 is composed of a stack of long, slim MCM substrates 78 (preferably Si). Each MCM 78 substrate consist of a row of pixels that has three major elements, fiber/waveguide 80,82, detector 84 and laser 86, as shown in FIG. 6. The incoming signals come through the fiber 80 on one side 88 of the MCM substrate 78, and ends on the other side 90 of the MCM substrate 78, which forms a row of light source. A stack of these substrates then form an array of light source. A detector/laser/fiber forms a optical regeneration channel right next to the incoming fiber 80, and converts the free-space signal back to guided-wave signal.

The extension board 14 may thus be utilized to allow the modules to communicate. In this application, the light (signal carrier) may come from both sides of the CGH 12. The signals from the PEs 22 transmit through the CGH 12 and arrive at the detector 84 of the pixels in the extension board 14 when they need to connect with PEs 22 in other modules. The detectors then drive associated lasers 86 to fire outgoing signals. Another group of signals may come from the incoming fiber or waveguide 80,82 with the signals arriving on the detectors of the processor board 10 through transparent areas 18 of the CGH board 12. This scheme may also be used to develop a crossbar switch, which may be used to provide for switching functions in this system. The crossbar switch could utilize the extension board 14 as described above along with a CGH board 12 and, instead of a processor board 10, a combination DMD/memory board (not shown) to provide programmable switching. An alternate method may be used on the extension board 14 utilizing detectors and surface emitting lasers along the vertical side of the extension board 14.

A preferred embodiment has been described in detail hereinabove. It is to be understood that the scope of the invention also comprehends embodiments different from those described, yet within the scope of the claims. For example, the optical source used in the above examples is a laser, however, a different source, such as any single frequency optical transmitter may be used. Similarly, though a CGH is preferred, a hologram fabricated by a different method, which performs essentially the same function may be used. The application presented is for parallel computing, however, the module, crossbar switch scheme, and the extension board may be used in other systems. Words of inclusion are to be interpreted as nonexhaustive in considering the scope of the invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A processing module comprising:
    a. at least one processing board comprising a plurality of processing elements each processing element comprising:
        i. at least one signal receiver for receiving an incoming signal to said processing element;
        ii. at least one signal transmitter for transmitting an outgoing signal from said processing element;
        iii. at least one digital micromirror device to provide intraboard and interboard communication with other processing elements;
    b. at least one computer generated hologram board which, in conjunction with said digital micromirror device, directs said outgoing signal and said incoming signal to and from other processing elements;
    c. at least one extension board which, in conjunction with said digital micromirror device and said computer generated hologram board, provides interboard communication between said processing element on said processing board and other processing elements on other processing boards; and
    d. at least one clear spot on said computer generated hologram board which allows said incoming signal and said outgoing signal from said processing element to reach said extension board.

2. The module of claim 1, wherein said signal receiver is a processor.

3. The module of claim 1, wherein said signal transmitter is a laser.

4. The module of claim 1, wherein said extension board converts optical signals to and from free-space.

\* \* \* \* \*